US005859771A

United States Patent [19]

Kniegl

[11] Patent Number: 5,859,771

[45] Date of Patent: Jan. 12, 1999

[54] HALF/FULL BRIDGE CONVERTER

[75] Inventor: Gregor Kniegl, Gmund, Germany

[73] Assignee: Transtechnik GmbH, Germany

[21] Appl. No.: 902,120

[22] Filed: Jul. 29, 1997

[30] Foreign Application Priority Data

Jul. 31, 1996 [DE] Germany ........................ 196 30 983.2

[51] Int. Cl.[6] ........................ H02M 7/5387; H02M 3/335

[52] U.S. Cl. ............................................... 363/132; 363/17

[58] Field of Search ................................. 363/17, 20, 24, 363/132, 133, 134

[56] References Cited

U.S. PATENT DOCUMENTS

| | | | |
|---|---|---|---|
| 4,213,049 | 7/1980 | Seifert | 378/105 |
| 4,700,287 | 10/1987 | Nilssen | 363/132 |
| 5,245,520 | 9/1993 | Imbertson | 363/132 |
| 5,715,155 | 2/1998 | Shahani et al. | 363/132 |
| 5,719,759 | 2/1998 | Wagner et al. | 363/132 |
| 5,764,494 | 6/1998 | Schutten et al. | 363/132 |
| 5,774,346 | 6/1998 | Poon et al. | 363/132 |

OTHER PUBLICATIONS

Bhat, Ashoka K.S.; "Analysis and Design of a Modified Series Resonant Converter"; IEEE Transactions on Power Electronics; vol. 8, No. 4; Oct. 1993.

Jain, Praveen; Dawson, F. P.; Dewan, Shashi B., "A Near–Zero Current–Switching Series Resonant Inverter Using GTO's"; IEEE Transactions on Industrial Electronics; Vo. 39, No. 4; Aug. 1992.

*Primary Examiner*—Stuart N. Hecker
*Attorney, Agent, or Firm*—St. Onge Steward Johnston & Reens LLC

[57] ABSTRACT

Known converters for converting a d.c. voltage at their input to a rectifiable a.c. voltage at the output operate reliably with very small input voltage fluctuations and relatively small fluctuations in load. In order to increase the range of input voltages and loads, it is proposed that a full-bridge converter with filter capacitors in one bridge branch be operated under low-load conditions as a half bridge, such that the capacitors form the midpoint of the half bridge, and under high-load conditions to change to full-bridge operation.

6 Claims, 5 Drawing Sheets

B1 B2 $U_E$ $S_A$ $M1$ $S_B$ W2 T C1 L2 W1 L1 $S_C$ $S_D$ $C_C$ $F_C$ $E_C$ $U_M$ M2 $E_D$ $C_D$ $F_D$ $E_C$ $E_D$ $U_{IST}$ $U_{SOLL}$ S A B C D

B1
B2
$U_E$
$S_A$
M1
$S_B$
L2
W2
T
W1
L1
C1
$S_C$
$S_D$
$U_M$
M2
$C_C$
$F_C$
$E_C$
$C_D$
$F_D$
$E_D$ $E_C$
$E_D$
$U_{IST}$
$U_{SOLL}$
S
A
B
C
D

A
B
C
D
G2
G1
K'
PSIC
P
$U_{IN}$
$E_C$ $E_D$
$u_x$
U
K
$U_{IST}$
$U_{SOLL}$

HALF/FULL BRIDGE CONVERTER

FIELD OF THE INVENTION

The present invention relates to a converter for the conversion of a d.c. voltage at the input into a rectifiable a.c. voltage at the output.

DESCRIPTION OF THE PRIOR ART

Converters of this type are generally operated in such a way that the output voltage remains substantially constant despite input voltage fluctuations of a few percent, as well as during certain fluctuations in load. An example of a full-bridge circuit, such as has been disclosed in the printed document Power Conversion, June 1994 Proceedings pp. 283–284, is described in the following with reference to the attached FIGS. 10 and 11.

The full-bridge circuit shown there comprises two bridge branches B1, B2, each of which comprises two series-connected electronic switches $S_A$, $S_B$ and $S_C$, $S_D$ respectively. The two branches are connected at points M1, M2 by a primary winding W1 of a transformer T. In parallel to the switches (e.g., IGBT's) diodes are disposed in the customary manner. The switches $S_{A-D}$ are further bridged by filter capacitors $C_A$, $C_B$, $C_C$ and $C_d$. In parallel to the primary winding W1, in the exemplary embodiment shown here, there is disposed an inductor L1.

The full-bridge converter so constructed operates by phase-shifting pulses of constant data (PSPWM, phase-shifted pulse with modulation), as shown in FIG. 11. According to this figure, the switches in one half-bridge, B1 or B2, open and close alternately so that the two bridges in a given branch B1 or B2 are never closed at the same time. During the periods in which the diagonal switches $S_{A-D}$ or $S_{B-C}$ are closed simultaneously, a current flows through the primary winding W1. The filter capacitors are so dimensioned and/or adjusted to the switching frequency (which is usually set to a substantially fixed value) that the associated switches always close only when the associated filter capacitors are completely discharged.

This full-bridge circuit can be driven by commercially available components (e.g. PSIC from UNITRODE, Model 3879), which drive it as shown in FIG. 11 and adjust the output voltage by shifting the phase of the pulses A, B for the first bridge branch B1 with respect to the phase of the pulses C, D of the second bridge branch B2.

Because the capacitance of the filter capacitors must be relatively high in order to divert the load from the switches effectively even with high output, considerable losses are caused by erroneous synchronization, i.e. when a switch is closed while the filter capacitor is still charged. Charge reversal or discharging of the capacitors is accomplished by the primary current. Hence when the load is small and the input voltage high, it can very easily happen that charge reversal or discharging is incomplete. In standard circuits of the kind described at the outset, this problem is not so clearly apparent because in general the range of loads is restricted; in particular, the basic load is fixed and the maximal output is relatively slight, so that the capacitances need only be quite low and, in turn, a relatively slight load is imposed on the switches. Furthermore, the range of input voltages ordinarily fluctuates by only a few percent.

In a particular range of applications, namely in supplying power to railways, there is the problem that the input voltage can vary by more than a factor of 2, for instance between 400 and 1000 V, at places along the track different distances away from the power station. The secondary voltage requirement can also fluctuate within very broad ranges, e.g. between 30 and 600 V. These extreme demands cannot be met with the converters previously in common use.

SUMMARY OF THE INVENTION

The object of the invention is to provide a converter that can be adjusted over a broad range of output voltages despite large variations in input voltage and load.

According to the present invention there is provided a converter for converting a d.c. voltage at the input into a rectified a.c. voltage at the output, with a resonant full-bridge chopper circuit, comprising a first half bridge circuit means with first and second controllable electronic switches;

a second half bridge circuit means with third and fourth controllable electronic switches which are each bridged by first and second capacitor means respectively;

an output transformer, the primary winding of which is arranged in series with a third capacitor means and the primary winding and third capacitor means being connected to each of the first and second half bridge circuit means at midpoints between the respective first and second, and third and fourth electronic switches;

a first inductor connected in parallel with the primary winding of the transformer; and control circuit means connected to said electronic switches and operative (a) in a "low load" operating state to form a half-bridge push-pull converter in a situation with at least one of a low output voltage, a high input voltage and a small load, the first and second electronic switches being opened and closed in alternation and their pulse width being modulated while the third and fourth electronic switches remain closed, and (b) in a "high load" operating state to form a full-bridge push-pull converter in a situation with at least one of a high output voltage, a low input voltage and a large load, the aforesaid electronic switches of both first and second half bridge circuit means being opened and closed in alternation and drive pulses for the aforesaid electronic switches being shifted in phase between the two half bridge circuit means for the purpose of regulation.

It is a feature of the invention presented here that one and the same circuit is operated as a half bridge under low load and as a full bridge under high load. The filter capacitors of the second half bridge thus serve to establish a mid point in the low-load range; that is, their charge is not completely reversed in this range. Their associated switches remain closed when the load is low. The drive circuitry functions to select the correct transition between the two modes of operation, such that no (substantial) losses occur. Commercially available PSIC's (UNITRODE 3879 or 3875) are used as drivers.

BRIEF DESCRIPTION OF THE DRAWINGS

A preferred embodiment of the invention will now be described with reference to the accompanying drawings, wherein.

DESCRIPTION OF THE PREFERRED EMBODIMENTS

Figure 10:
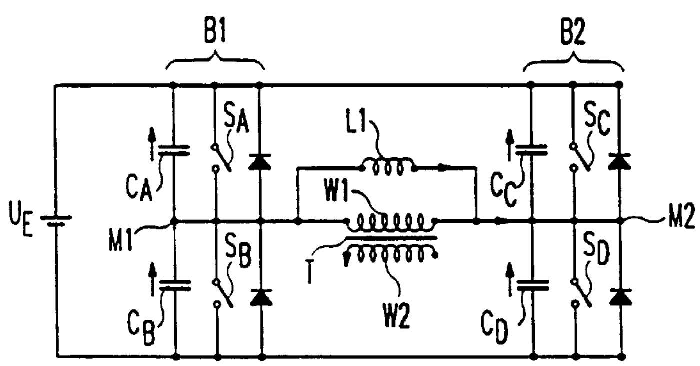
FIGS. 10 and 11 show a circuit and a time diagram to explain the state of the art.
Figure 11:
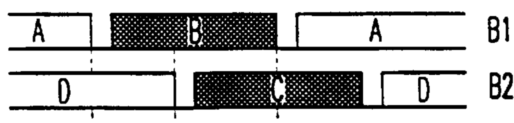

In the following description, identical reference numerals and letters are used for identical parts or parts with identical function, and the same designations were used above in the description of the state of the art with reference to FIGS. 10 and 11.

Figure 1:
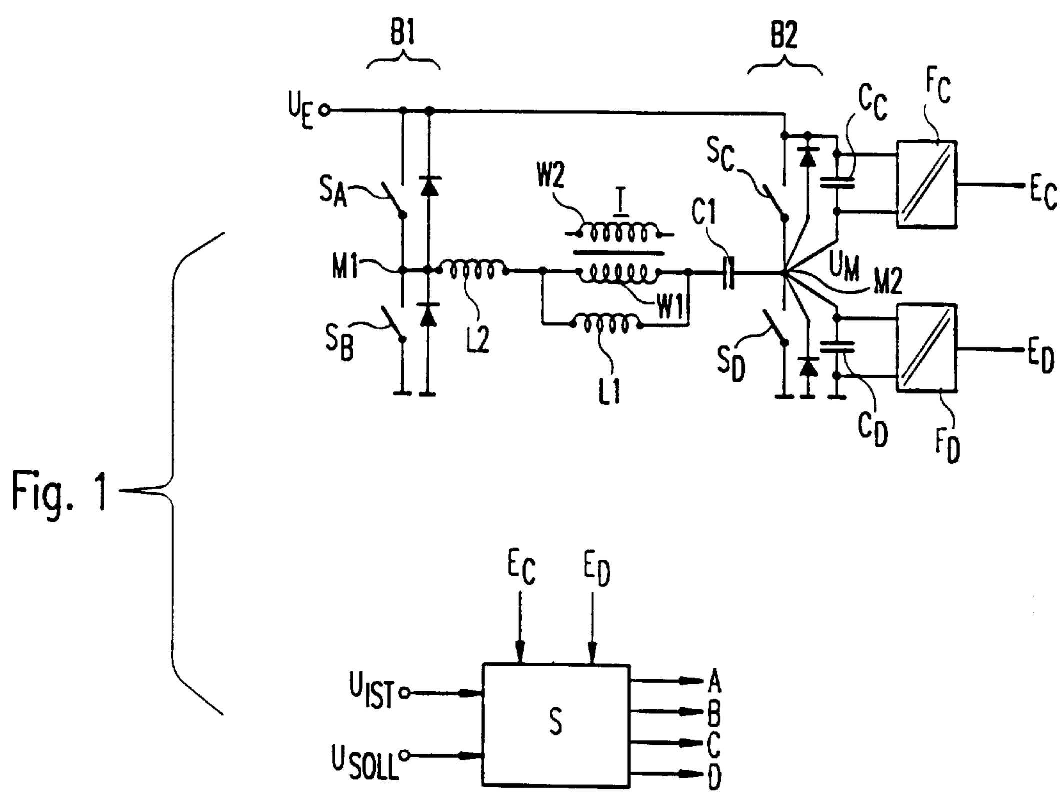
FIG. 1 is a schematic circuit diagram of a converter according to the invention.

As shown in FIG. 1, the converter comprises two bridge branches B1 and B2, which are made up of switches $S_A$, $S_B$ and $S_C$, $S_D$ respectively. Between the middle points M1 and M2 of the bridge branches B1 and B2 is disposed a transformer T, with its primary winding W1 connected in series with a capacitor C1 and a coil L2. A coil L1 is connected in parallel with the primary winding W1. In the second bridge branch B2 filter capacitors $C_C$ and $C_d$ are connected in parallel with the switches $S_C$ and $S_D$, and monitoring circuits $F_C$ and $F_D$ are provided in parallel with these capicators. The output signals of the latter, $E_C$ and $E_D$, which indicate the voltage across the capacitors $C_C$ and $C_d$, are input to a control circuit S, which controls the switches $S_{A\text{-}D}$. Also input to the control circuit S are an actual voltage $U_{IST}$ and a set-point voltage $U_{SOLL}$, from which, as is described in greater detail below, the control signals for the switches $S_{A\text{-}D}$ are derived.

In the following description of the control circuit S reference is made to FIG. 2, which shows that circuit schematically.

Figure 2:
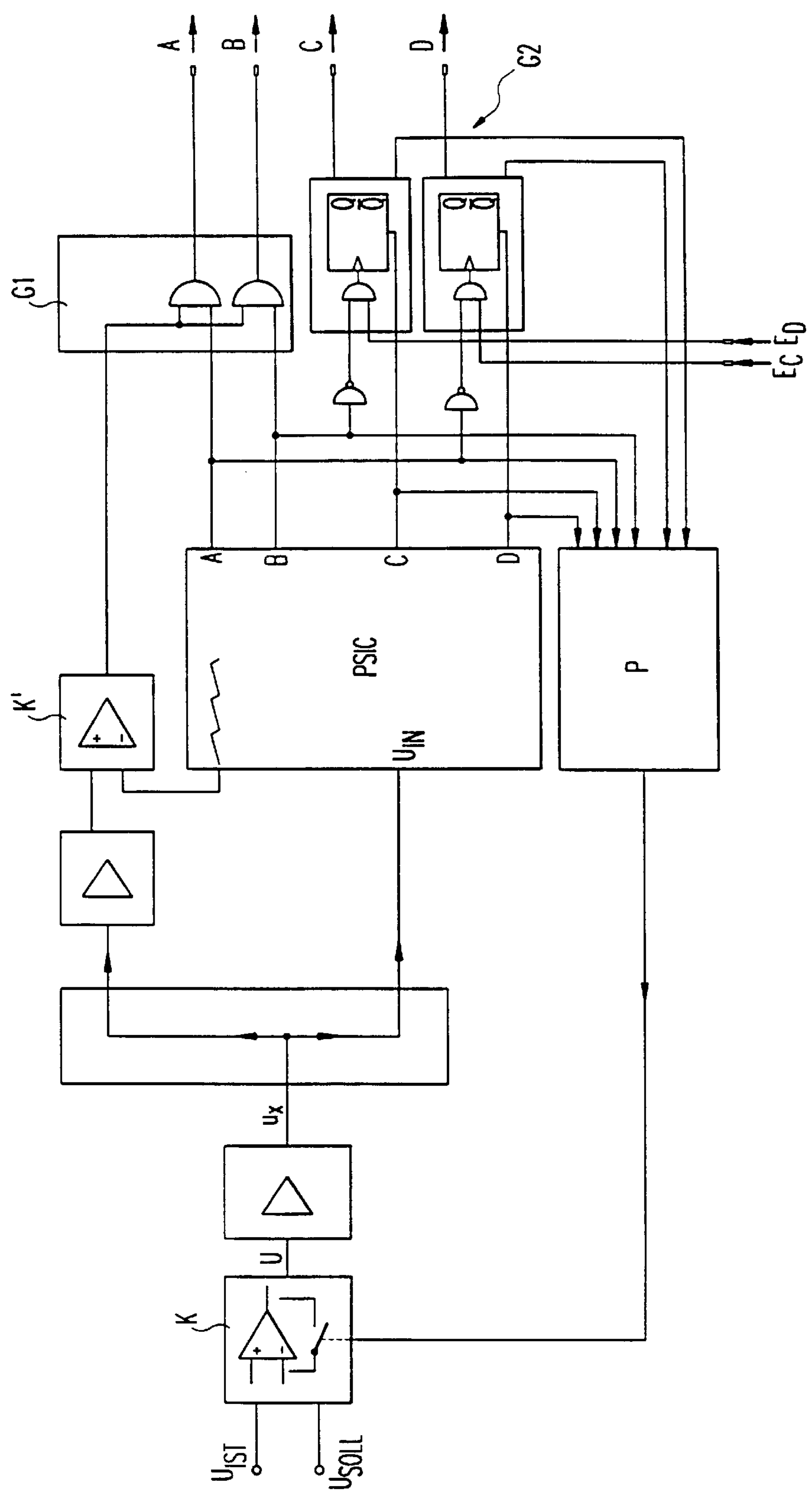
FIG. 2 shows a drive circuit for use with the converter shown in FIG. 1.

As can be seen in FIG. 2, the control circuit S comprises a first comparator circuit K to which the voltage signals $U_{IST}$ and $U_{SOLL}$ are input. The output signal u of the comparator circuit K, after its level has been adjusted to give the signal $u_x$, is sent to a control input $U_{IN}$ of the pulse-generating circuit PSIC as well as (by way of an amplifier) to a second comparator circuit K'. This second comparator K' also receives the sawtooth waveform output by the pulse-generating circuit PSIC, so that the comparator circuit K' generates output pulses of duration corresponding to the difference between $U_{IST}$ and $U_{SOLL}$. These pulses are input to two AND gates of a first logical circuit G1, which also receives output pulses A and B from the pulse-generating circuit PSIC. The combined signals are sent as drive pulses to the switches $S_A$and $S_B$.

The other output pulses of the PSIC, the pulse signals C and D, are each sent to a flip-flop, the clock inputs of which are connected to the outputs of AND gates. One input of each of these AND gates is connected by way of an inverter to the B or A, respectively, output of the PSIC, while the other input of the AND gates receives the signal $E_C$ or $E_D$, respectively, which represents the voltage across the capacitor $C_C$ or $C_d$.

The Q-outputs of the flip-flops control the switches $S_C$ and $S_D$. The inverted outputs Q are sent to inputs of a protective circuit P, as also are the outputs A–D of the control circuit PSIC. The output of the protective circuit P is sent to a limiter input of the comparator K so that when the protective circuit P is activated, the comparator K keeps its output voltage u constant despite an increasing difference between $U_{IST}$ and $U_{SOLL}$.

The function of circuits constructed as shown in FIGS. 1 and 2 will now be explained.

Figure 3:
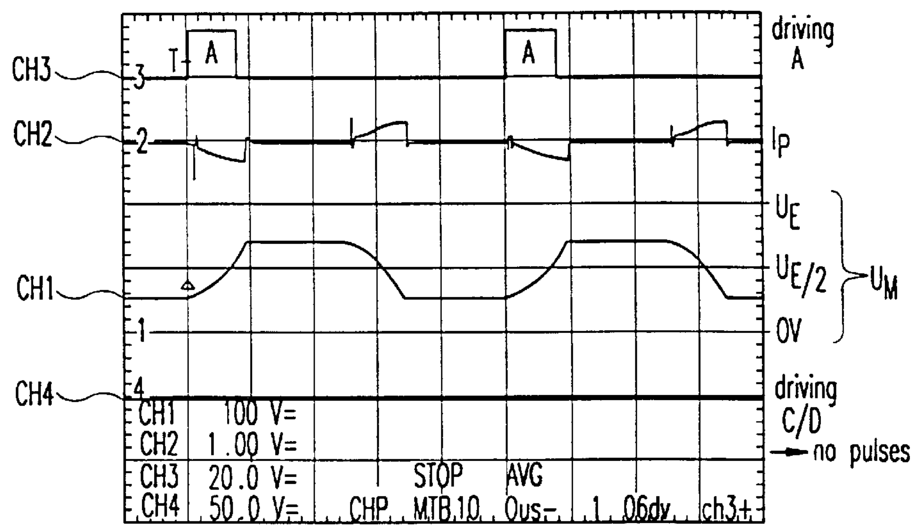
FIGS. 3 to 7 are time diagrams to explain how the circuit is driven under various load conditions.

FIG. 3 shows the case in which only a low output is needed. It is assumed that the resulting primary current is too small to reverse the charge on the capacitors $C_C$ and $C_D$ completely, given narrow pulse widths for A, B. This means that the switches $S_C$ and $S_D$ are never turned on, and hence that no output pulses from them are available. Therefore the output voltage is determined exclusively by modulation of the width of the A/B pulses, as shown in FIG. 3. The circuit thus operates as a half bridge.

Figure 4:
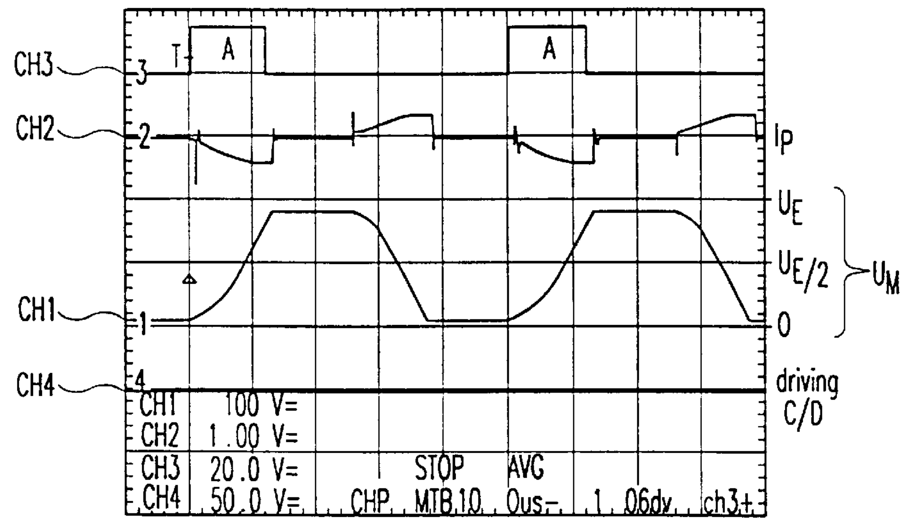
Figure 5:
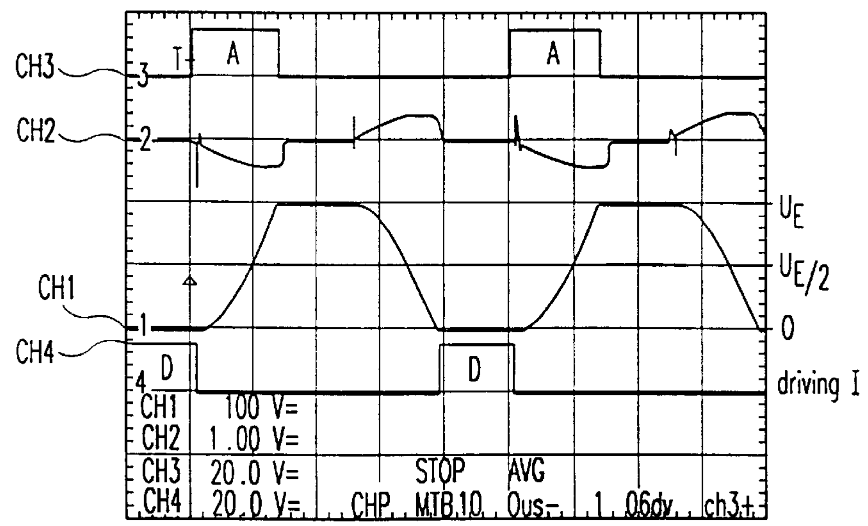

If a larger output is demanded, the pulses A and B become wider, as shown in FIG. 4. The range of voltage variation $U_M$ is larger. When $U_M$ reaches the lower and upper limits 0 V and $+U_E$, the switches $S_C$ and $S_D$ in the second bridge branch B2 also come into operation. This is shown in FIG. 5.

Figure 6:
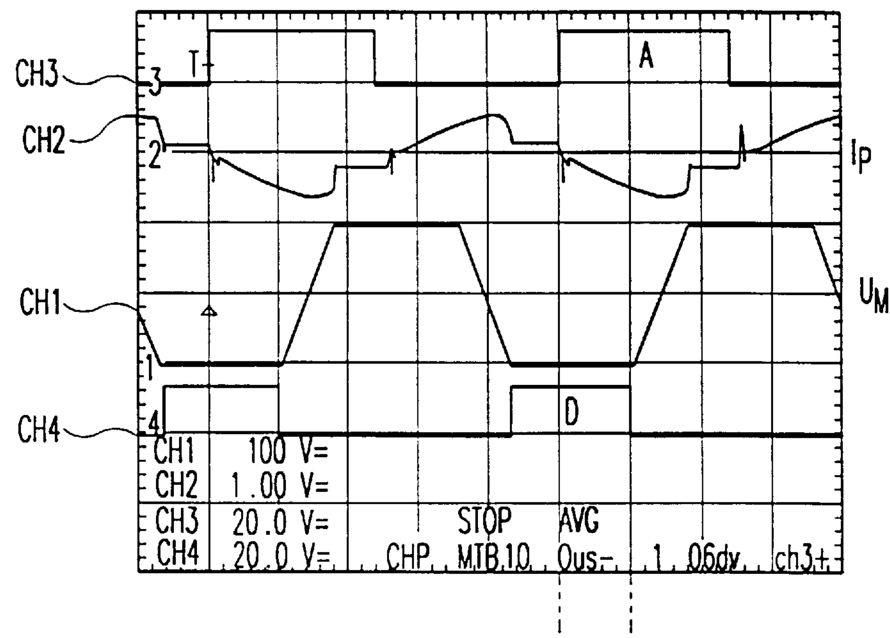
Figure 7:
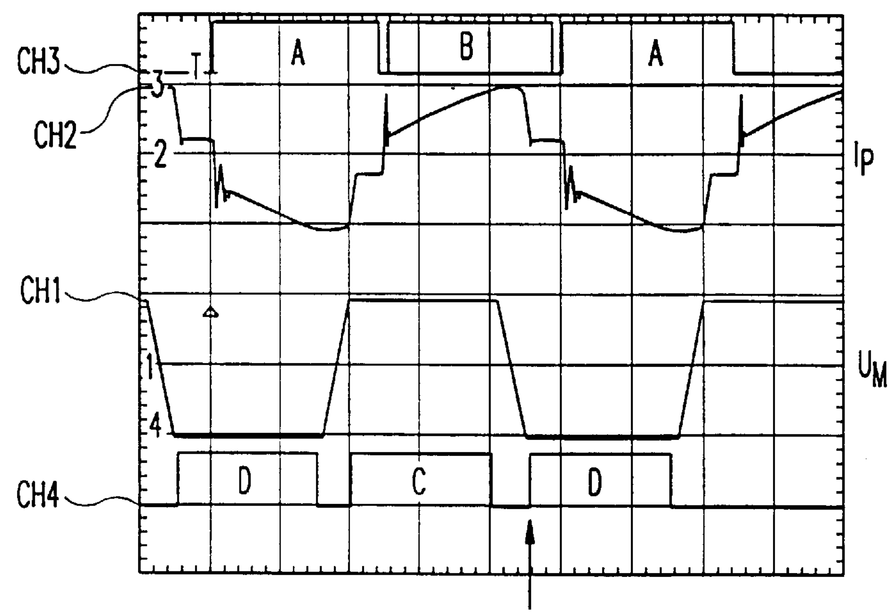

If the power requirement now rises still further, the first effect is that the pulses A, B are set at their maximal width. By suitable dimensioning it is ensured that in this state, at the latest, the condition for turning on C and D is satisfied, so that the charge on the capacitors $C_C$ and $C_d$ is completely reversed. Now (as the power requirement continues to rise) the time during which A and D (or B and C) overlap is increased according to the power requirement, as shown in FIG. 6. The overlap time is represented by vertical dashed lines. In this state the converter operates as a full-bridge converter (known per se), with phase-shifted driving, in which the time at which C and D turn on is determined by the condition for activation, as indicated by the arrow in FIG. 7. At the point shown by the arrow, the activation condition is met. The gap between the pulses C and D is thus a function of the load resistance and the input voltage.

To prevent a too-small input voltage $U_E$ from causing the PSIC to open too far, so that C/D pulses are no longer produced at all, the above-mentioned limitation of the comparator K is implemented.

In the exemplary embodiment of a converter shown here, operation is possible with a switching frequency of 20 kHz, input voltages between 400 and 1000 V and output voltages from 30 to 600 V. The inductance L1 can be 0.8 to 1 mH and the inductance L2, about 3 $\mu$H. The value of the capacitor C1 should be approximately 10 $\mu$F, and that of the load-diverting capacitors, 0.1 $\mu$F.

Figure 8:
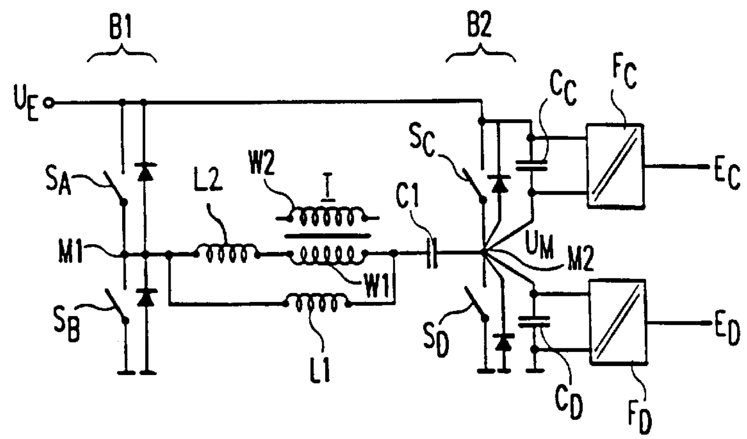
FIG. 8 shows a modification of the converter circuit shown in FIG. 1.

The circuit shown in FIG. 8 is modified in comparison with that in FIG. 1, in such a way as to improve the EMC characteristics; in particular electromagnetic interference is reduced.

The modification of the circuit shown in FIG. 1 to produce that of FIG. 8 amounts merely to making the inductor or coil L2 a saturable choke and connecting the inductor or coil L1 in parallel with the serial arrangement of coil L2 and primary winding W1 of the transformer T.

This arrangement avoids abrupt charging or discharging of the internal switch capacitors in the switches $S_A$ and $S_B$. That is, in known devices the load current $I_2$ becomes 0 before the switch $S_A$ or $S_B$ turns off. However, a specified current $I_1$ will flow through the coil L1 and will charge or discharge the internal switch capacitors. The dead time between the turn-off of one switch and the turn-on of the other is adjusted in this way so that the charging or discharging processes are completed. The coil L2 in the form of a saturable choke is needed to decouple the discharging current $I_1$ from the load current $I_2$. The coil L2 in the form of a saturable choke further ensures that the conditions for turning off are constant, and independent of the load and input voltages.

Figure 9:
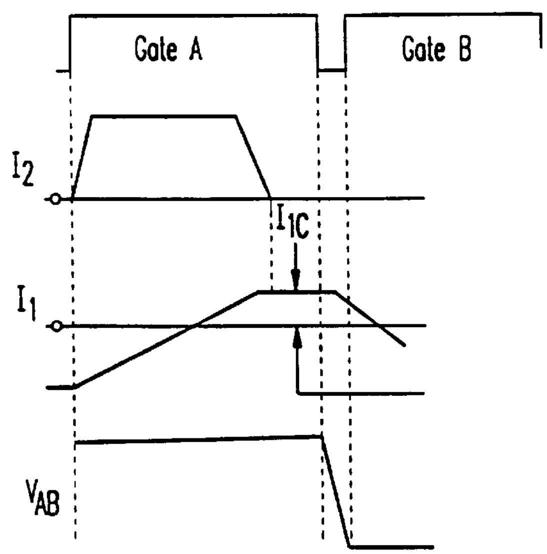
FIG. 9 shows time diagrams to explain the behavior of charging and load current for the converter shown in FIGS. 8.

Regarding the temporal behavior of load current $I_2$ and charging current $I_1$, as well as the voltage at the midpoint of the bridge $V_{AB}$, reference is made to the time diagrams in FIG. 9. Shortly before the switch $S_A$or $S_B$ (here the switch $S_A$) turns off, the charging current $I_1$ reaches a plateau and remains approximately constant at this level (arrow $I_{1c}$). This constant component $I_{1c}$ is responsible for the charging of the internal capacitors.

It can also be discerned from the above that the invention likewise refers to a method of operating or driving a converter.

What is claimed is:

1. A converter for converting a d.c. voltage at the input into a rectified a.c. voltage at the output, with a resonant full-bridge chopper circuit, comprising a first half bridge circuit means with first and second controllable electronic switches;

a second half bridge circuit means with third and fourth controllable electronic switches which are each bridged by first and second capacitor means respectively;

an output transformer, the primary winding of which is arranged in series with a third capacitor means and the primary winding and third capacitor means being connected to each of the first and second half bridge circuit means at midpoints between the respective first and second, and third and fourth electronic switches;

a first inductor connected in parallel with the primary winding of the transformer; and control circuit means connected to said electronic switches and operative (a) in a "low load" operating state to form a half-bridge push-pull converter in a situation with at least one of a low output voltage, a high input voltage and a small load, the first and second electronic switches being opened and closed in alternation and their pulse width being modulated while the third and fourth electronic switches remain closed, and (b) in a "high load" operating state to form a full-bridge push-pull converter in a situation with at least one of a high output voltage, a low input voltage and a large load, the aforesaid electronic switches of both first and second half bridge circuit means being opened and closed in alternation and drive pulses for the aforesaid electronic switches being shifted in phase between the two half bridge circuit means for the purpose of regulation.

2. A converter as claimed in claim 1, wherein a second inductor is provided connected in series with the primary winding of the transformer in order to attenuate turn-on peaks.

3. A converter as claimed in claim 2, wherein the second inductor a saturable choke and the first inductor is connected in parallel with the series arrangement of the primary winding of the transformer and the second inductor.

4. A converter as claimed in claim 1, wherein the control circuit means comprises voltage sensing means that sample the state of charge of the third and fourth capacitors and switch the operating state from the "low load" operating state to the "high load" operating state whenever the third and fourth capacitors are charged and discharged during the switching cycles in such a way that the associated third and fourth electronic switches can be activated without substantial loss.

5. A converter as claimed in claim 1, wherein the control circuit means comprises protective circuit means that prevents the third and fourth electronic switches of the second half bridge circuit means from closing when the input voltage is too low.

6. A converter as claimed in claim 1, wherein the control circuit means comprises a comparator (K), which compares a voltage to be regulated with a set-point voltage and generates a comparison signal substantially proportional to the difference;

a first pulse-generating means that drives the first and second electronic switches in the first half bridge circuit means by generating pulses with a duration substantially proportional to the comparison signal;

driving circuit means which generates four pulse signals to drive the four electronic switches in a full-bridge circuit, the degree of overlap between the pulse signals being substantially proportional to the comparison signal;

first gate circuit means to which the four pulse signals and the generated pulses are sent and which drives the first and second switches of the first half bridge circuit means branch as a pair;

voltage sensing means that sample the state of charge of the third and fourth capacitors charge and emit a high-load signal whenever the third and fourth capacitors are substantially discharged during the switching cycles; and second gate circuit means to which the four pulse signals and the high-load signal are sent and which drives the third and fourth electronic switches of the second half bridge circuit means branch as a pair.

* * * * *